US009979297B2

(12) United States Patent
Sugahara et al.

(10) Patent No.: US 9,979,297 B2
(45) Date of Patent: May 22, 2018

(54) CURRENT RESONANT POWER SUPPLY DEVICE

(71) Applicant: SANKEN ELECTRIC CO., LTD., Niiza-Shi, Saitama (JP)

(72) Inventors: Takeki Sugahara, Higashimatsuyama (JP); Osamu Ohtake, Saitama (JP)

(73) Assignee: SANKEN ELECTRIC CO., LTD., Niiza-shi (JP)

( * ) Notice: Subject to any disclaimer, the term of this patent is extended or adjusted under 35 U.S.C. 154(b) by 0 days. days.

(21) Appl. No.: 15/637,714

(22) Filed: Jun. 29, 2017

(65) Prior Publication Data

US 2018/0041129 A1 Feb. 8, 2018

Related U.S. Application Data

(60) Provisional application No. 62/372,029, filed on Aug. 8, 2016, provisional application No. 62/372,051, filed on Aug. 8, 2016.

(51) Int. Cl.
  *H02M 3/335* (2006.01)
  *H02M 1/42* (2007.01)
  (Continued)

(52) U.S. Cl.
  CPC ............ *H02M 3/315* (2013.01); *G05F 1/652* (2013.01); *H02M 1/4225* (2013.01);
  (Continued)

(58) Field of Classification Search
  CPC ....... H02M 1/4241; H02M 2007/4815; H02M 3/335; H02M 3/33569; H02M 2001/0035; H02M 2001/0032
  See application file for complete search history.

(56) References Cited

U.S. PATENT DOCUMENTS 7,313,004 B1 * 12/2007 Yang ................. H02M 3/33523
  363/21.02
7,881,082 B2 * 2/2011 Sato ................... H02M 3/33507
  363/21.03
(Continued)

FOREIGN PATENT DOCUMENTS

| JP | 5212016 B2 | 6/2013 |
| JP | 5384973 B2 | 1/2014 |
| JP | 2014060895 A | 4/2014 |

*Primary Examiner* — Gary L Laxton
(74) *Attorney, Agent, or Firm* — Metrolexis Law Group, PLLC (57) ABSTRACT

A burst oscillation circuit operates switches in a burst oscillation mode based on a feedback signal. A first burst operation cancellation threshold voltage comparator compares a first burst operation cancellation threshold voltage set higher than a voltage of the feedback signal that a load current reaches the standby threshold and a voltage of the feedback signal, and outputs a first output signal. A second burst operation cancellation threshold voltage comparator compares a second burst operation cancellation threshold voltage set lower than the voltage of the feedback signal that the load current reaches the standby threshold and higher than a voltage of the feedback signal during a non-oscillation period of the burst oscillation operation and the voltage of the feedback signal and outputs a second output signal. A standby cancellation circuit generates a standby cancel signal to cancel the standby state based on the first and second output signal.

5 Claims, 5 Drawing Sheets

(51) Int. Cl.
*H02M 3/315* (2006.01)
*H02M 3/337* (2006.01)
*G05F 1/652* (2006.01)
*H02M 1/00* (2006.01)
*H02M 7/48* (2007.01)

(52) U.S. Cl.
CPC ......... *H02M 3/335* (2013.01); *H02M 3/3376* (2013.01); *H02M 2001/0032* (2013.01); *H02M 2001/0035* (2013.01); *H02M 2001/0058* (2013.01); *H02M 2007/4818* (2013.01)

(56) References Cited

U.S. PATENT DOCUMENTS

| | | | |
|---|---|---|---|
| 2007/0165426 A1* | 7/2007 | Kyono | H02M 3/337 363/21.02 |
| 2010/0135050 A1 | 6/2010 | Sonobe | |
| 2010/0202162 A1* | 8/2010 | Yang | H02M 3/33523 363/21.02 |
| 2016/0065075 A1 | 3/2016 | Sugahara et al. | |

* cited by examiner

CURRENT RESONANT POWER SUPPLY DEVICE

CROSS REFERENCE TO RELATED APPLICATIONS

This application claims priority based on 35 USC 119 from prior provisional Patent Application No. 62/372,029 filed on Aug. 8, 2016 and from prior provisional Patent Application No. 62/372,051 filed on Aug. 8, 2016. This application is further related to patent application Ser. No. 14/749,690 filed on Jun. 25, 2015, which is based upon and claims the benefit of priority from prior Japanese Patent Application No. 2014-174959 filed on Aug. 29, 2014, and issued as U.S. Pat. No. 9,564,826 on Feb. 7, 2017. The entire contents of all of the above are incorporated herein by reference.

BACKGROUND

The present disclosure relates to a current resonant power supply device, and particularly relates to a current resonant power supply device, which can achieve reduced power consumption under light load.

Japanese Patent Application Publication No. 2014-60895 (Patent Literature 1) and Japanese Patent No. 5384973 (Patent Literature 2) disclose current resonant power supply devices that can achieve reduced power consumption under light load.

The current resonant power supply device of Patent Literature 1 judges whether the device is currently in a light load state by comparing a power value detected by the power detection circuit with threshold Vref. Patent Literature 1 discloses a burst oscillation operation that may be performed while controlling the cycle of the burst oscillation if it is judged that the device is currently in the light load state.

The current resonant power supply device of Patent literature 2 detects the phase of current flowing through the switching elements. If the phase of the detected current is smaller than a predefined value, the current resonant power supply device judges that the device is currently in a light load state, and operates in a burst oscillation mode while operating the high side switch and the low side switch at unequal duty ratios.

Meanwhile, when changed to a standby load state, an Inductor Inductor Capacitor (LLC) current resonant system receives a standby signal generated externally, and switches from a normal operation state to a standby state.

Specifically, the standby signal is outputted from a system microcomputer on the secondary side of a transformer and is inputted into a power control integrated circuit (IC) on the primary side of the transformer via a photocoupler. For example, an SB (standby) terminal of the power control IC on the primary side of the transformer receives the standby signal from the photocoupler on the secondary side of the transformer.

The current resonant power supply devices disclosed in Patent Literatures 1 and 2 are capable of transitioning to a burst mode upon detection of a light load state.

U.S. Patent Application Publication No. 2016/0065075 (Patent literature 3) discloses a current resonant power supply device that comprises a first switch and a second switch connected in series to both terminals of a DC power source; a series circuit comprising a reactor, a primary winding of a transformer, and a capacitor connected in series, and connected to a node between the first and second switches and first terminal of the DC power source; a rectifier smoothing circuit that rectifies and smoothens a voltage generated across a secondary winding of the transformer and outputs a DC voltage; a control circuit that alternately turns the first and second switches on and off; a voltage detection circuit that detects the DC voltage from the rectifier smoothing circuit; a signal generation circuit that generates a feedback signal based on the DC voltage detected by the voltage detection circuit, and outputs the feedback signal, the feedback signal being for turning the first and second switches on and off; a load current detection circuit that detects load current contained in resonance current flowing through the capacitor; a standby state detection circuit that detects a standby state based on the load current detected by the load current detection circuit and a standby threshold; and a burst oscillation circuit that operates the first and second switches in a burst oscillation mode based on the feedback signal if the standby state is detected.

SUMMARY

One or more embodiments provide a current resonant power supply device including a first switch and a second switch connected in series to both terminals of a DC power source; a series circuit including a reactor, a primary winding of a transformer, and a capacitor connected in series, and connected to a node between the first and second switches and one terminal of the DC power source; a rectifier smoothing circuit that rectifies and smoothens a voltage generated across a secondary winding of the transformer and outputs a DC voltage; a voltage detection circuit that detects the DC voltage from the rectifier smoothing circuit; a signal generation circuit that generates a feedback signal based on the DC voltage detected by the voltage detection circuit, and outputs the feedback signal, the feedback signal for turning the first and second switches on and off; a load current detection circuit that detects load current contained in resonance current flowing through the capacitor; a standby state detection circuit that detects a standby state based on the load current detected by the load current detection circuit and a standby threshold; a burst oscillation circuit that operates the first and second switches in a burst oscillation mode based on the feedback signal when the standby state is detected; a first burst operation cancellation threshold voltage comparator that compares a first burst operation cancellation threshold voltage set higher than a voltage of the feedback signal that the load current reaches the standby threshold and a voltage of the feedback signal, and outputs a first output signal; a second burst operation cancellation threshold voltage comparator that compares a second burst operation cancellation threshold voltage set lower than the voltage of the feedback signal that the load current reaches the standby threshold and higher than a voltage of the feedback signal during a non-oscillation period of the burst oscillation operation and the voltage of the feedback signal and outputs a second output signal; and a standby cancellation circuit that generates a standby cancel signal to cancel the standby state based on the first and second output signal.

One or more embodiments may further provide a current resonant power supply device including an AC power source; a power factor correction circuit that corrects a power factor of an AC current with respect to an AC voltage from the AC power source; a series circuit including a switch and a primary winding of a transformer connected in series, the series circuit being connected to both ends of a DC power source of the power factor correction circuit in series; a rectifier smoothing circuit that rectifies and smoothens a voltage generated across a secondary winding of the transformer and outputs a DC voltage; a voltage detection circuit that detects the DC voltage from the rectifier smoothing circuit; a signal generation circuit that generates a feedback signal based on the DC voltage detected by the voltage detection circuit and outputs the feedback signal, the feedback signal being for turning the switch on and off; a load current detection circuit that detects load current; a standby state detection circuit that detects a standby state based on the load current detected by the load current detection circuit and a standby threshold; a burst oscillation circuit that operates the switch in a burst oscillation mode based on the feedback signal when the standby state is detected; a first burst operation cancellation threshold voltage detector that detects a first burst operation cancellation threshold voltage set higher than a voltage of the feedback signal that the load current reaches the standby threshold; a second burst operation cancellation threshold voltage detector that detects a second burst operation cancellation threshold voltage set lower than the voltage of the feedback signal if the load current reaches the standby threshold and higher than a voltage of the feedback signal during a non-oscillation period of the burst oscillation; a standby cancellation circuit that generates a signal to cancel the standby state based on the detected first and second burst operation cancellation threshold voltages; and an operation stop controller that stops operation of the power factor correction circuit if the standby state is detected by the standby state detection circuit.

DETAILED DESCRIPTION

Embodiments of current resonant power supply devices are explained with reference to the drawings. In the respective drawings referenced herein, the same constituents are designated by the same reference numerals and duplicate explanations concerning the same constituents is omitted for ease of description. All of the drawings are provided to illustrate respective examples only. No dimensional proportions in the drawings, unless otherwise indicated, shall impose a restriction on the various embodiments. For this reason, specific dimensions, dimensional relationships, ratios and the like should be interpreted with the following descriptions taken into consideration. In addition, the drawings may include parts whose dimensions, dimensional relationships and ratios are different from one drawing to another.

Figure 1:
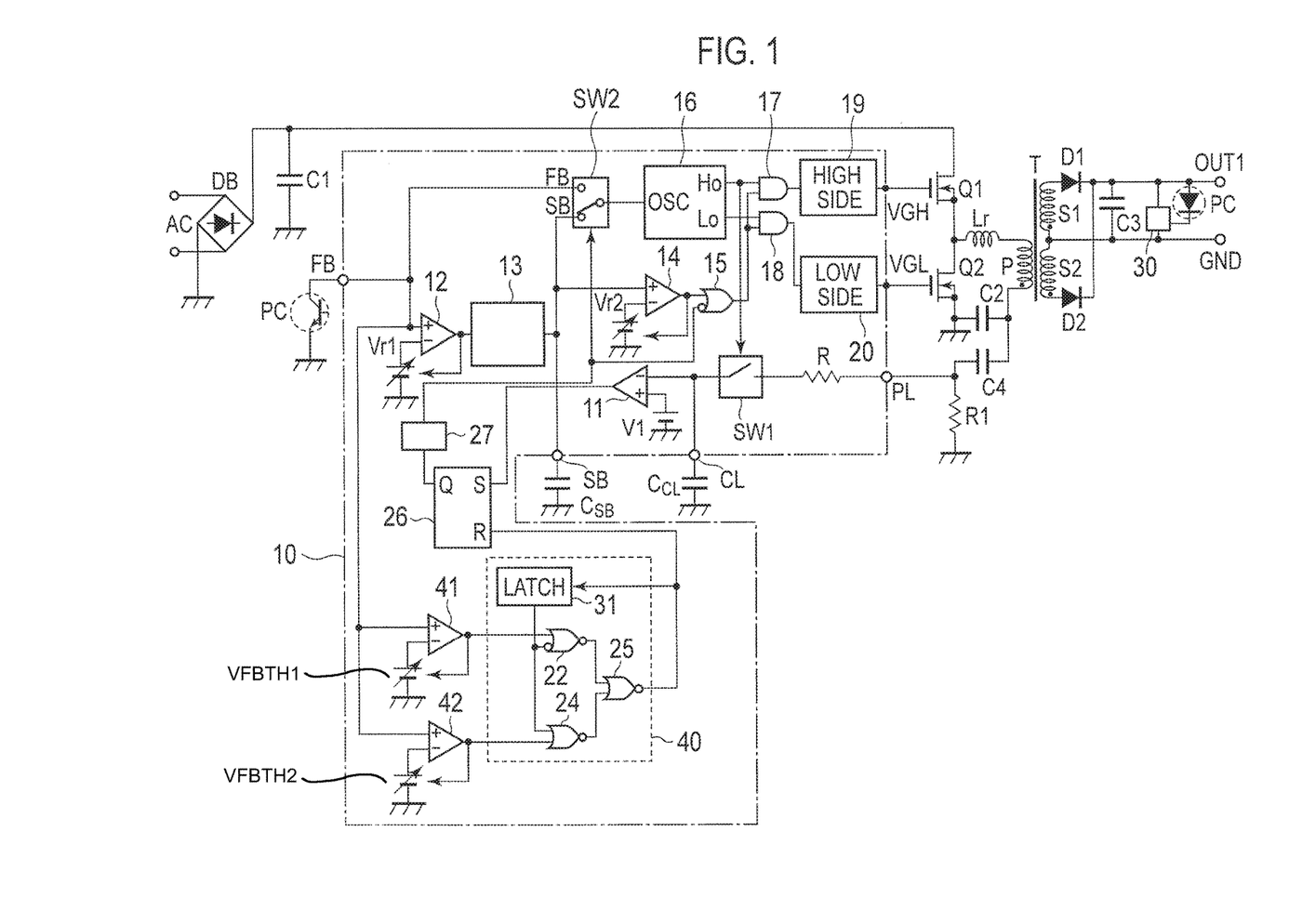
FIG. 1 is a configuration diagram illustrating elements of a current resonant power supply device according to one or more embodiments.

FIG. 1 is a diagram illustrating a configuration of a current resonant power supply device according to one or more embodiments. The current resonant power supply device illustrated in FIG. 1 includes full-wave rectifier circuit DB, capacitor C1, control circuit 10, reactor Lr, switching elements Q1 and Q2, transformer T, diodes D1 and D2, capacitors C2 to C4, photocoupler PC, output voltage detector 30, capacitors $C_{CL}$ and $C_{SB}$, resistor R1. Photocoupler PC may apply a signal from a phototransistor to the feedback (FB) terminal of the control circuit 10 as will be further described below.

Full-wave rectifier circuit DB is configured to perform full-wave rectification of an AC voltage input and to output, via capacitor C1, a full-wave rectified voltage to switching element Q1 (example of a first switch) and switching element Q2 (example of a second switch) that are connected in series. Switching elements Q1 and Q2 each include a switching element such as a MOSFET.

A series circuit including reactor Lr for current resonance, primary winding P of transformer T, and capacitor C2 for current resonance is connected between the drain and source of switching element Q2. Secondary winding S1 and secondary winding S2 of transformer T are connected in series. The anode of diode D1 is connected to a first terminal of secondary winding S1. The anode of diode D2 is connected to a first terminal of secondary winding S2.

The cathode of diode D1 and the cathode of diode D2 are connected to a first terminal of capacitor C3, the anode of a photodiode of photocoupler PC, and a first terminal of output voltage detector 30. The second terminal of secondary winding S1 and the second terminal of secondary winding S2 are connected to the second terminal of capacitor C3 and the second terminal of output voltage detector 30.

Switching element Q1 and switching element Q2 may be alternately turned on and off according to a control signal output from control circuit 10. Output voltage detector 30 is configured to detect an output voltage across capacitor C3, and output the detected voltage to the FB terminal of primary-side control circuit 10 as a feedback signal via photocoupler PC.

Control circuit 10 alternately turns switching element Q1 and switching element Q2 on and off based on a feedback signal from output voltage detector 30. The first terminal of capacitor C4 is connected to the first terminal of primary winding P of transformer T and the first terminal of capacitor C2, the first terminal of resistor R1 is connected to the second terminal of capacitor C4, and the second terminal of resistor R1 is grounded.

Control circuit 10 includes comparators 11, 12, 14, 41, and 42, charge and discharge controller 13, switch circuit SW2, logic circuit 15, oscillator (OSC) 16, AND circuits 17 and 18, high side driver 19, low side driver 20, logic circuit 27, flip flop circuit 26, and selector 40. Control circuit 10 may be implemented by a single integrated circuit (IC). Control circuit 10 may be implemented by a plurality of integrated circuits.

Control circuit 10 includes: a $V_{GH}$ terminal connected to the gate of switching element Q1, a $V_{GL}$ terminal connected to the gate of switching element Q2, a PL terminal connected to the first terminal of resistor R1, a CL terminal connected to capacitor $C_{CL}$, an SB terminal connected to capacitor $C_{SB}$, and the FB terminal connected to the collector of the phototransistor in photocoupler PC.

Selector 40 includes logic circuits 22, 24 and 25, and latch circuit 31. Selector 40 inputs signals from comparators 41 and 42 and outputs to flip flop circuit 26.

The cancellation of burst oscillation is now described. Cancellation after the burst oscillation operation of switching elements Q1 and Q2 may be based on a feedback signal when a standby state is detected.

Comparator 41 (an example of first burst operation cancellation threshold voltage comparator) compares a first burst operation cancellation threshold voltage set higher than a voltage of the feedback signal when the load current reaches the standby threshold to the feedback signal voltage and outputs an output a signal to selector 40.

Comparator 42 (an example of a second burst operation cancellation threshold voltage comparator) compares a second burst operation cancellation threshold voltage set lower than the voltage of the feedback signal if the load current reaches the standby threshold and higher than a voltage of the feedback signal during a non-oscillation period of the burst oscillation operation to the feedback signal voltage and outputs a signal to selector 40.

Selector 40 detects one of the output signals from comparators 41 and 42 and holds information of cancellation condition at the first or second burst operation cancellation threshold voltage. Selector 40 outputs a high (H) signal to a reset terminal (R) of flip flop circuit 26. Flip flop circuit 26 switches states based on a signal inputted to the reset terminal. Logic circuit 27 switches oscillating frequency. Selector 40, Flip flop circuit 26 and logic circuit 27 (an example of standby cancellation circuit) generate a signal to cancel the standby state based on the signals from comparators 41 and 42. When switch SW2 receives the signal to cancel the standby state, switch SW2 is switched to the FB terminal from the SB terminal.

Next, the current resonant power supply device is described. In accordance with an automatic standby function, the current resonant power supply device switches from a normal operation state to a standby state by detecting a load of a standby state by control circuit 10 without receiving any standby signal, such as an external standby signal from the outside. The load in the standby state is detected using information on current flowing through the primary wiring of the transformer.

In an LLC current resonance system, the current flowing through the primary winding of the transformer contains cyclic current (current not to be sent to a secondary side of the transformer) and load current (current in proportion to output current). The current resonant power supply device can detect the standby state by retrieving only information on the load current from the current of the primary winding.

Figure 2A:
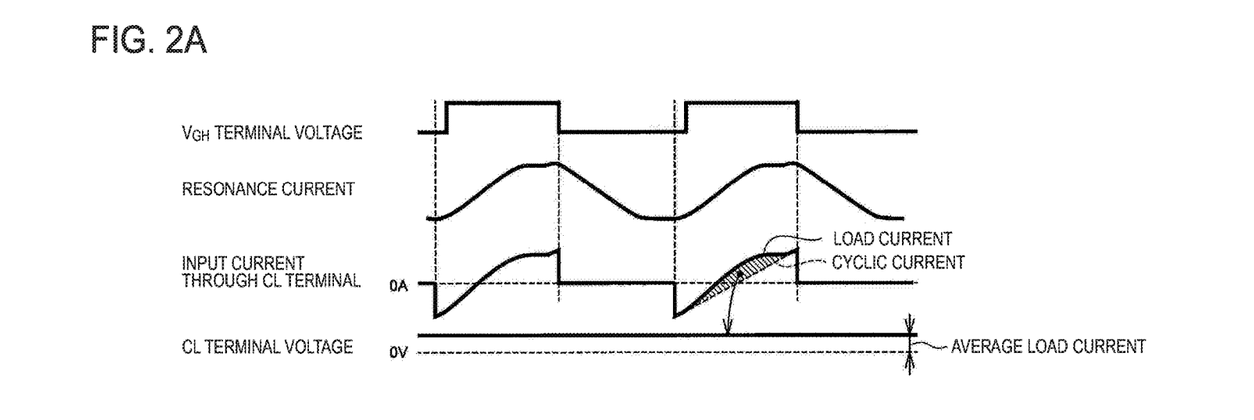
FIGS. 2A and 2B are charts illustrating operations of parts of the current resonant power supply device under light load and heavy load.
Figure 2B:
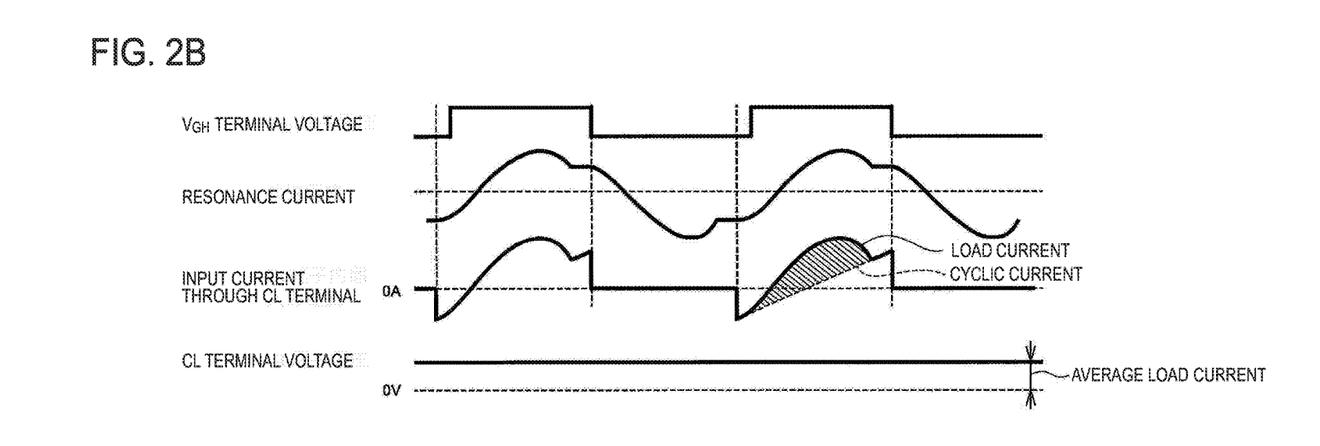

FIGS. 2A and 2B are charts illustrating operations of parts of the current resonant power supply device under light load and heavy load and under voltage pulse signal timing conditions. FIG. 2A illustrates waveforms under light load and FIG. 2B illustrates waveforms under heavy load. In general, the oscillating cycle under heavy load may be longer than that under light load.

As illustrated in FIGS. 2A and 2B, resonance current flows through primary winding P of transformer T upon application of a $V_{GH}$ terminal voltage. The resonance current is extracted by capacitor C4 (equivalent to a load current detection circuit of the embodiments) and inputted to the CL terminal via switch SW1 of control circuit 10, so that input current through the CL terminal is obtained. The input current through the CL terminal contains load current and cyclic current similar to the current of the primary winding of the transformer described above.

As illustrated in FIGS. 2A and 2B, in the case of taking in the input current through the CL terminal during an on period of switching element Q1, the cyclic current flows in the same amount on the positive and negative sides as represented by the waveforms and therefore becomes zero on average. On the other hand, the load current is integrated over the on period by capacitor $C_{CL}$ connected to the CL terminal, and thus a CL terminal voltage being a DC voltage equivalent to an average load current value is obtained. Since the CL terminal voltage reflects information on the load current, the CL terminal voltage (or average load current) under heavy load is higher than that under light load. Note that capacitors C4 and $C_{CL}$ may correspond to the load current detection circuit of the embodiments.

Standby detection comparator 11 (example of a standby state detection circuit) will now be described. Standby detection comparator 11 is configured to receive input of a voltage across capacitor $C_{CL}$ at its inverting input terminal and input of standby threshold V1 at its non-inverting input terminal. If the voltage across capacitor $C_{CL}$ is equal to or higher than standby threshold V1, standby detection comparator 11 detects a normal operation state, and thus outputs L level to the set terminal (S) of the flip flop circuit 26, causing an output from the Q terminal of the flip flop circuit 26, through logic circuit 27, and to switch SW2, which switches to FB terminal.

In this case, the feedback signal inputted to the FB terminal is outputted to oscillator (OSC) 16 via switch SW2. The oscillator (OSC) 16 controls the oscillating cycle (frequency) of a pulse signal according to the value of the feedback signal and generates a high-side pulse signal and a low-side pulse signal. The signal levels of the high-side (Ho) pulse signal and the low-side (Lo) pulse signal, may change between H level and L level alternately with time intervals between transitions.

For the purposes of this section "AND" is used as a verb to refer to a logical operation in which inputs to a logic element are combined in a Boolean AND operation. AND circuit 17 is configured to AND the high-side (Ho) pulse signal and an output from logic circuit 15 and send the result of the AND operation as a logic output to high side driver 19. AND circuit 18 is configured to AND the low-side (Lo) pulse signal and the output from logic circuit 15 and send the result of the AND operation as a logic output to low side driver 20.

High side driver 19 is configured to turn switching element Q1 on or off in response to the result of the AND operation output from AND circuit 17. Low side driver 20 is configured to turn switching element Q2 on or off in response to the result of the AND operation output from AND circuit 18.

In the case where standby detection comparator 11 detects the normal operation state, logic circuit 15 outputs H level to AND circuits 17 and 18, and hence switching element Q1 and switching element Q2 are alternately turned on and off.

Next, if the voltage across capacitor $C_{CL}$ is lower than standby threshold V1, standby detection comparator 11 detects a standby state, and thus outputs H level to the set terminal (S) of flip flop circuit 26, generating an output at the Q terminal of flip flop circuit 26, which causes switch SW2 to switch to a standby terminal (SB terminal).

When switch SW2 is switched to the feedback terminal, (FB terminal), Comparator 12 is configured to receive input of a feedback signal from the FB terminal at its non-inverting input terminal and input of first reference voltage Vr1 at its inverting input terminal, and turn on charge and discharge controller 13 if the feedback signal is equal to or higher than first reference voltage Vr1.

However, when SW2 is switched to the standby terminal (SB terminal), Capacitor $C_{SB}$ is connected to the SB terminal of switch SW2 and an output terminal of charge and discharge controller 13. Charge and discharge controller 13 is configured to charge capacitor $C_{SB}$ while it is in an on state.

The non-inverting input terminal of comparator 14 is connected to first terminal of capacitor $C_{SB}$, the SB terminal of switch SW2, and an output terminal of charge and discharge controller 13. Comparator 14 corresponds to a burst oscillation operation unit, and is configured to receive input of a voltage of capacitor $C_{SB}$ at its non-inverting input terminal and input second reference voltage Vr2 at its inverting input terminal. If the voltage of capacitor $C_{SB}$ is equal to or higher than second reference voltage Vr2, comparator 14 outputs H level to logic circuit 15.

In this case, logic circuit 15 outputs H level to AND circuits 17 and 18, and the pulse signals of oscillator (OSC) 16 are thereby outputted to high side driver 19 and low side driver 20. Thus, switching element Q1 and switching element Q2 are alternately turned on and off.

Then, if the feedback signal input to the non-inverting terminal of comparator 12 becomes lower than first reference voltage Vr1, the output of comparator 12 goes to L level and charge and discharge controller 13 is set at an off state and therefore capacitor $C_{SB}$ is discharged. Then, if the voltage of capacitor $C_{SB}$ becomes lower than second reference voltage Vr2, comparator 14 outputs L level to logic circuit 15 to stop output from oscillator (OSC) 16. The burst oscillation operation of the switching operation can be achieved by the repetition of the above processes.

In other words, comparator 12 charges or discharges capacitor $C_{SB}$ via charge and discharge controller 13 based on a comparison between the feedback signal and first reference voltage Vr1, which can determine an output voltage variation range during the standby state.

Next, the burst oscillation operation is described in detail with reference to a chart illustrated in FIG. 3. First, the output voltage increases in a no load state or the light load state. Due to the increase in the output voltage, the FB terminal voltage decreases to near 0 (zero) voltage by the feedback signal. When the FB terminal voltage becomes equal to or lower than the oscillation stop voltage VFB (OFF), the SB terminal voltage decreases to near 0 (zero) voltage by an electric discharge control of charge and discharge controller 13. That is, the SB terminal voltage becomes equal to or lower than the oscillation stop voltage VSB(OFF) and then the oscillation stops. When the oscillation stops, the output voltage gradually decreases and the FB terminal voltage gradually increases (at t1 in FIG. 3). When the FB terminal voltage becomes higher than the oscillation start voltage VFB(ON), the SB terminal voltage increases by a charge control of change and discharge controller 13. Second, if the SB terminal voltage becomes equal to or lower than the oscillation stop voltage VSB(OFF) and if the FB terminal voltage becomes the oscillation stop voltage VFB(OFF), the switching operation stops and the output voltage decreases. As the output voltage decreases, the FB terminal voltage increases. If the FB terminal voltage reaches oscillation start voltage VFB(ON), the voltage of the non-inverting input terminal of comparator 12 becomes high, and hence comparator 12 outputs an H level signal to charge and discharge controller 13 to charge capacitor $C_{SB}$ at the SB terminal with a constant current value. The SB terminal voltage thereby increases with a constant slope. The voltage value of reference voltage Vr1, which is input to the inverting terminal of comparator 12 is also decreased by a certain amount once the output becomes H level.

Figure 3:
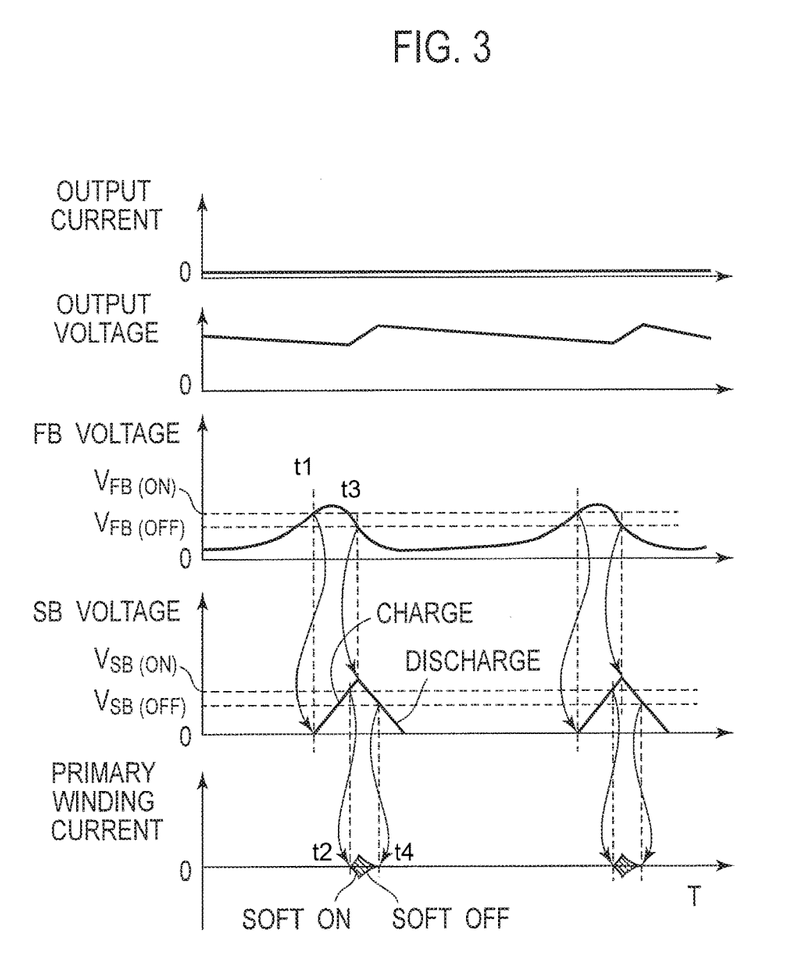
FIG. 3 is a chart illustrating waveforms at a time of a burst oscillation operation of the current resonant power supply device.

Next, if the SB terminal voltage reaches oscillation start voltage VSB(ON), the switching operation restarts (at t2 in FIG. 3). Here, oscillator OSC 16 determines a switching frequency based on the SB terminal voltage. In the state where the SB terminal voltage is low, oscillator OSC outputs a high oscillating frequency. The oscillator OSC 16 decreases the oscillating frequency along with an increase in the SB terminal voltage. The oscillating frequency in the state of the low SB terminal voltage is higher than a frequency at the peak of the resonance point of the series circuit including reactor Lr for current resonance, primary winding P of transformer T, and capacitor C2. Accordingly, current flowing through the series circuit is small at first, and then increases gradually as the oscillating frequency gets closer to the frequency of the resonance point along with the increase in the SB terminal voltage, so that the output voltage increases gradually (e.g. referred to as "soft-on").

As the output voltage increases, the FB terminal voltage is decreased gradually by the operation of output voltage detector 30 via photocoupler PC. If the FB terminal voltage falls below the value of reference voltage Vr1 (the value decreased by the certain amount), the output from comparator 12 is inverted into L level, and thus charge and discharge controller 13 discharges capacitor $C_{SB}$ at the SB terminal with a constant current value (from t3 to t4 in FIG. 3). The SB terminal voltage thereby decreases gradually, and the switching operation stops once the voltage becomes equal to or lower than oscillation stop voltage VSB(OFF) again (at t4 in FIG. 3). Here, as the SB terminal voltage decreases, the oscillating frequency gets farther from the frequency at the peak of the resonance point of the series circuit including reactor Lr for current resonance, primary winding P of transformer T, and capacitor C2, so that the current flowing through the series circuit is decreased gradually and shut off (e.g. referred to as "soft-off").

The charge/discharge period of the SB terminal with soft-on/soft-off function depends on the capacitance value of capacitor $C_{SB}$.

As described above, according to the current resonant power supply device, capacitors C4 and $C_{CL}$ detect load current contained in resonance current flowing through capacitor C2 and then standby detection comparator 11 detects the standby state based on the detected load current and the threshold, and thus a signal for the burst oscillation operation can be generated based on the feedback signal upon detection of the standby state. This enables switching to the standby state without a standby signal from the outside, which reduces the cost for a photocoupler and its peripheral circuit used for standby.

Now referring again to FIG. 3, the detection of the FB voltage for improving the responsiveness of transition from a standby state to a normal operation state is described.

The output current at terminal OUT1 is substantially constant. The output voltage at terminal OUT1 increases for a certain period and then gradually decreases.

With the increase of the output voltage, the FB terminal voltage in the standby state changes as illustrated in FIG. 3. In the example, the voltage varies around 0 to 1 V. Control circuit 10 may perform intermittent oscillation alternating a short oscillation period and a long non-oscillation period. With this intermittent oscillation, the FB terminal voltage decreases after overshooting during the oscillation period and gradually increases during the non-oscillation period.

If a sudden change of the load from this standby state increases the load current, the output voltage decreases, and the FB terminal voltage increases. Now, a discussion is given for a case where the threshold voltage is set higher than the peak voltage of the overshoot during the oscillation period to transition from the standby state to the normal operation state monitoring the FB terminal voltage. In this case, there is a large voltage difference to reach the threshold from FB voltage during the non-oscillation period. As a result, a time lag occurs while transitioning to a normal operation state. This increases the dip amount of the output voltage.

Multiple threshold voltages are set at terminal FB for transitioning to the normal operation state as for the FB voltage during the oscillation period or the non-oscillation period in the standby state.

Figure 4:
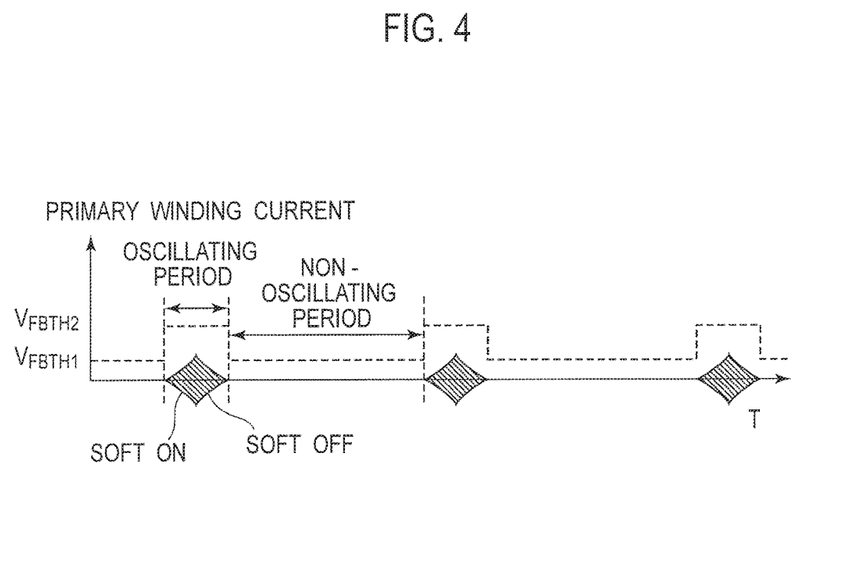
FIG. 4 is a diagram illustrating an explanation of changing threshold voltage of an FB terminal in case of non-oscillating period.

FIG. 4 is a diagram for explaining an example of setting the multiple threshold voltages at terminal FB for transitioning to the normal operation state as for the FB voltage during the oscillation periods and the non-oscillation periods in the standby state. Different standby cancellation threshold voltages at terminal FB are set for the oscillation period and for the non-oscillation period. For example, it may be preferable to set a standby cancellation threshold voltage (VFBTH1) at terminal FB for the non-oscillation period lower than a standby cancellation threshold voltage (VFBTH2) at terminal FB for the oscillation period. It may also be preferable to set the standby cancellation threshold voltage (VFBTH1) at terminal FB for the non-oscillation period lower than the peak voltage of the overshoot during the oscillation period.

In a case where the threshold is set lower than the peak voltage of the overshoot during the oscillation period to transition from the standby state to the normal operation state monitoring the FB terminal voltage, the voltage difference to reach the thresholds from the FB voltage during the non-oscillation period is small. As a result, the time lag up to the transition to the normal operation state can be made small. This reduces the dip amount of the output voltage.

In the example, the standby cancellation threshold voltage (VFBTH2) at terminal FB for the oscillation period may be set to 1.1 V, and the standby cancellation threshold voltage (VFBTH1) at terminal FB for the non-oscillation period may be set to 0.6V, for example. This makes it possible to reduce the time lag and transition quickly from the standby state to the normal operation state.

Here, an input correction may be made for the standby cancellation threshold voltage.

Although the two detection comparators are used for detecting the standby cancellation threshold voltage in various embodiments, the invention is not limited thereto, and the number of comparators may be one. In this case, the comparator may detect the threshold voltage only during the oscillation periods, for example. Alternatively, the number of comparators may be increased to three, four, or five, for example, as necessary. Moreover, a comparator with a high threshold for detecting a dynamic load may be added as necessary.

Figure 5:
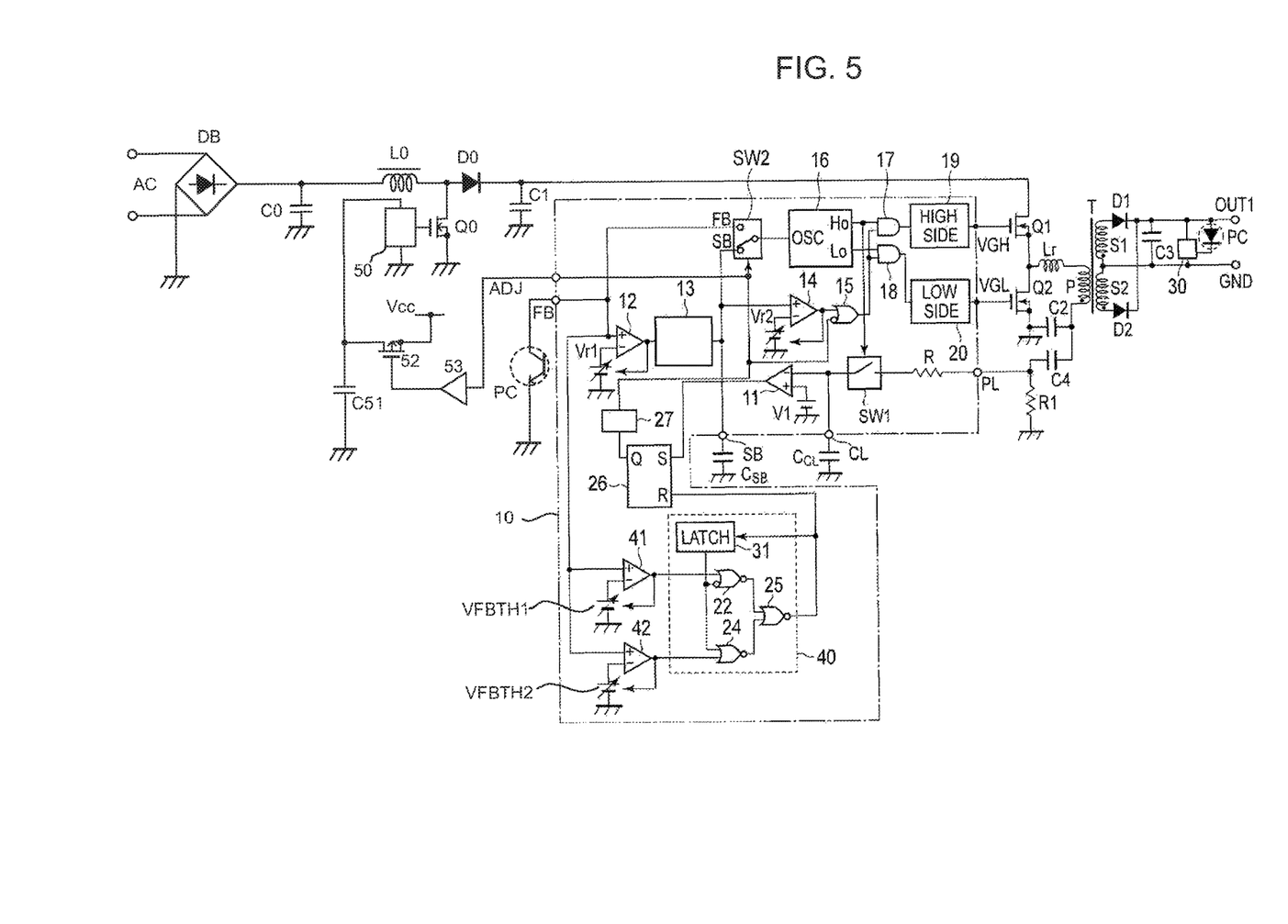
FIG. 5 is a configuration diagram illustrating elements of a current resonant power supply device according to one or more embodiments

Next, FIG. 5 is a configuration diagram illustrating elements of a current resonant power supply device according to one or more embodiments. The current resonant power supply device includes a power factor correction (PFC) circuit. Specifically, the current resonant power supply device includes capacitor C0, reactor L0, diode D0, PFC control circuit 50, capacitor C51, switching element Q0, p-type MOSFET 52, and buffer 53. Note that at least buffer 53 and p-type MOSFET 52 correspond to an operation stop controller.

The PFC circuit is connected between full-wave rectifier circuit DB and capacitor C1. Capacitor C0 is connected between the output terminal of full-wave rectifier circuit DB and the ground. Reactor L0 and diode D0 are connected in series between capacitor C1 and capacitor C0. The drain of switching element Q0 is connected to a connection point between reactor L0 and diode D0. The source of switching element Q0 is grounded. The gate of switching element Q0 is connected to PFC control circuit 50. The source of p-type MOSFET 52 is connected to DC power supply having Vcc voltage. The drain of p-type MOSFET 52 is connected to PFC control circuit 50. The gate of p-type MOSFET 52 is connected to the output terminal of buffer 53. One terminal of Capacitor C51 is connected to the drain of p-type MOSFET 52 and the other terminal of capacitor C51 is grounded. Buffer 53 receives the output (signal ADJ) from logical circuit 27 of control circuit 10.

When standby detection comparator 11 detects the normal operation state, the DC power is supplied to PFC control circuit 50 via p-type MOSFET 52. In the normal operation state, PFC control circuit 50 controls switching element Q0 by PWM control. Accordingly, the PFC circuit corrects a power factor of an AC current with respect to an AC voltage from the AC power source. When standby detection comparator 11 detects the standby state, the DC power supply to PFC control circuit stops. That is, the operation of the PFC circuit stops if the standby state is detected.

As described above, the current resonant power supply device includes comparators 41 and 42 to detect the multiple burst operation cancellation threshold voltages, and selector 40 generates the signal to cancel the standby state based on the multiple burst operation cancellation threshold voltages. This reduces the voltage difference to reach the threshold from the FB voltage during the non-oscillation period, which makes the time lag up to the transition to the normal operation state small. As a result, it is possible to reduce the dip amount of the output voltage.

The invention may include other embodiments in addition to the above-described embodiments without departing from the spirit of the invention. The embodiments are to be considered in all respects as illustrative, and not restrictive. The scope of the invention is indicated by the appended claims rather than by the foregoing description. Hence, all configurations including the meaning and range within equivalent arrangements of the claims are intended to be embraced in the invention.

The invention claimed is:

1. A current resonant power supply device comprising:
   a first switch and a second switch connected in series to both terminals of a DC power source;
   a series circuit including a reactor, a primary winding of a transformer, and a capacitor connected in series, and connected to a node between the first and second switches and one terminal of the DC power source;
   a rectifier smoothing circuit that rectifies and smoothens a voltage generated across a secondary winding of the transformer and outputs a DC voltage;
   a voltage detection circuit that detects the DC voltage from the rectifier smoothing circuit;
   a signal generation circuit that generates a feedback signal based on the DC voltage detected by the voltage detection circuit, and outputs the feedback signal, the feedback signal for turning the first and second switches on and off;
   a load current detection circuit that detects load current contained in resonance current flowing through the capacitor;
   a standby state detection circuit that detects a standby state based on the load current detected by the load current detection circuit and a standby threshold;
   a burst oscillation circuit that operates the first and second switches in a burst oscillation mode based on the feedback signal when the standby state is detected;
   a first burst operation cancellation threshold voltage comparator that compares: i) a first burst operation cancellation threshold voltage set higher than a first voltage value of the feedback signal when the load current reaches the standby threshold; and ii) a voltage of the feedback signal, and outputs a first output signal based on the comparing;
a second burst operation cancellation threshold voltage comparator that compares: iii) a second burst operation cancellation threshold voltage set lower than the first voltage value of the feedback signal when the load current reaches the standby threshold and higher than a second voltage value of the feedback signal during a non-oscillation period of the burst oscillation operation; and ii) the voltage of the feedback signal, and outputs a second output signal based on the comparing; and
a standby cancellation circuit that generates a standby cancel signal to cancel the standby state based on the first and second output signal.

2. The current resonant power supply device of claim 1, wherein
the standby detection circuit detects the standby state and outputs a standby state detection signal, when the load current detected by the load current detection circuit is smaller than the standby threshold, the burst oscillation circuit performs the burst oscillation operation in response to the standby state detection signal; and
the standby cancellation circuit generates the standby cancel signal, when ii) the voltage of the feedback signal exceeds the first burst operation cancellation threshold voltage during an oscillation period of the burst oscillation operation, or when ii) the voltage of the feedback signal exceeds the second burst operation cancellation threshold voltage during the non-oscillation period of the burst oscillation operation, the burst oscillation circuit cancels the standby state in response to the standby cancel signal.

3. The current resonant power supply device of claim 1, wherein
the burst oscillation circuit comprises
a charge and discharge controller that is turned on or off depending on magnitude of the feedback signal,
a signal capacitor that is charged if the charge and discharge controller is turned on and discharged if the charge and discharge controller is turned off, and
a burst oscillation operation unit that activates or deactivates the burst oscillation operation depending on magnitude of a voltage from the signal capacitor.

4. The current resonant power supply device of claim 1, further comprising:
an AC power source;
a power factor correction circuit that corrects a power factor of an AC current with respect to an AC voltage from the AC power source; and
an operation stop controller that stops operation of the power factor correction circuit if the standby state is detected by the standby state detection circuit.

5. A current resonant power supply device comprising:
an AC power source;
a power factor correction circuit that corrects a power factor of an AC current with respect to an AC voltage from the AC power source;
a series circuit including a switch and a primary winding of a transformer connected in series, the series circuit being connected to both ends of a DC power source of the power factor correction circuit in series;
a rectifier smoothing circuit that rectifies and smoothens a voltage generated across a secondary winding of the transformer and outputs a DC voltage;
a voltage detection circuit that detects the DC voltage from the rectifier smoothing circuit;
a signal generation circuit that generates a feedback signal based on the DC voltage detected by the voltage detection circuit and outputs the feedback signal, the feedback signal being for turning the switch on and off;
a load current detection circuit that detects load current;
a standby state detection circuit that detects a standby state based on the load current detected by the load current detection circuit and a standby threshold;
a burst oscillation circuit that operates the switch in a burst oscillation mode based on the feedback signal when the standby state is detected;
a first burst operation cancellation threshold voltage detector that detects a first burst operation cancellation threshold voltage set higher than i) a first voltage value of the feedback signal when the load current reaches the standby threshold;
a second burst operation cancellation threshold voltage detector that detects a second burst operation cancellation threshold voltage set lower than i) the first voltage value of the feedback signal when the load current reaches the standby threshold and higher than ii) a second voltage value of the feedback signal during a non-oscillation period of the burst oscillation;
a standby cancellation circuit that generates a signal to cancel the standby state based on the detected first and second burst operation cancellation threshold voltages; and
an operation stop controller that stops operation of the power factor correction circuit if the standby state is detected by the standby state detection circuit.

* * * * *